United States Patent
Candor

(10) Patent No.: US 10,156,659 B2
(45) Date of Patent: Dec. 18, 2018

(54) SMARTPHONE THAT DETECTS LIGHTNING STRIKES AND SYSTEM THAT DETERMINES LIGHTNING STRIKE LOCATIONS USING SMARTPHONES

(71) Applicant: ACCUWEATHER, INC., State College, PA (US)

(72) Inventor: James T. Candor, State College, PA (US)

(73) Assignee: ACCUWEATHER, INC., State College, PA (US)

(*) Notice: Subject to any disclaimer, the term of this patent is extended or adjusted under 35 U.S.C. 154(b) by 39 days.

(21) Appl. No.: 14/801,300

(22) Filed: Jul. 16, 2015

(65) Prior Publication Data

US 2016/0018563 A1 Jan. 21, 2016

Related U.S. Application Data

(60) Provisional application No. 62/025,290, filed on Jul. 16, 2014.

(51) Int. Cl.
*G01R 31/02* (2006.01)
*G01W 1/16* (2006.01)

(52) U.S. Cl.
CPC ..................... *G01W 1/16* (2013.01)

(58) Field of Classification Search
CPC ........... G01W 1/16; G01W 1/02; G01W 1/10; G01W 2203/00; G01W 1/04; G01W 1/00;
(Continued)

(56) References Cited

U.S. PATENT DOCUMENTS 5,331,330 A * 7/1994 Susnjara ............... G01C 21/20
342/182
6,177,873 B1 1/2001 Cragun
(Continued)

FOREIGN PATENT DOCUMENTS

JP 200510166 A 1/2005
JP 2006520497 A 9/2006
(Continued)

OTHER PUBLICATIONS

H. Bloemink; "Static Electricity Measurements for Lightning Warnings—An Exploration"; Royal Netherlands Meteorological Institute; De Bilt, 2013; pp. 1-23.
(Continued)

*Primary Examiner* — Vinh Nguyen
(74) *Attorney, Agent, or Firm* — Blank Rome LLP

(57) ABSTRACT

A portable communication device, including a location detection unit configured to determine the location of the device, a lightning detection unit configured to determine a distance between the lightning strike and the device, and a radio frequency circuit configured to output, via a communication network, data indicative of the location of the device and the distance between the lightning strike and the device. A system, including a lightning detection database and an analysis unit configured to receive, from the device via the communication network, data indicative of the location of the device and the distance between a lightning strike and the device, determine the location of the lightning strike based in part on the distance from the lightning strike to the location of the device, and store the location of the lightning strike in the lightning detection database.

18 Claims, 8 Drawing Sheets

(58) Field of Classification Search
CPC .... H02G 13/60; H02G 13/80; G01R 29/0842; G01R 31/085; G01R 15/142; G01R 29/12; G01R 31/3275; H04L 12/1845; H04L 12/1895; H04L 51/14; H04L 67/02; H04H 20/59; G06F 17/30241; G06F 17/3087; G08C 25/00; H04M 1/72569; H04M 2250/10; H04M 2250/12; H04M 1/0274; H04M 1/6041; H04M 2242/04; H04M 3/5116; G01N 33/0075; G06K 7/10366; G08B 21/043; G08B 21/10; G08B 21/18; G01S 13/951; G01S 7/04
See application file for complete search history.

(56) References Cited

U.S. PATENT DOCUMENTS

| | | | |
|---|---|---|---|
| 7,016,785 B2* | 3/2006 | Makela | G01W 1/16 |
| | | | 702/4 |
| 7,080,018 B1 | 7/2006 | Fox et al. | |
| 7,181,345 B2 | 2/2007 | Rosenfeld et al. | |
| 7,200,418 B2* | 4/2007 | Kaikuranta | G01R 29/0842 |
| | | | 455/556.1 |
| 7,254,484 B2* | 8/2007 | Jantunen | G01W 1/16 |
| | | | 702/4 |
| 7,461,137 B2 | 12/2008 | Ryan et al. | |
| 7,515,087 B1* | 4/2009 | Woodell | G01S 7/22 |
| | | | 342/175 |
| 7,751,978 B1 | 7/2010 | Neilley et al. | |
| 7,869,953 B1* | 1/2011 | Kelly | G01S 7/04 |
| | | | 342/460 |
| 8,588,821 B1 | 11/2013 | Hewinson | |
| 8,990,333 B2 | 3/2015 | Johnson et al. | |
| 9,459,117 B2 | 10/2016 | Baig | |
| 2001/0030624 A1* | 10/2001 | Schwoegler | G01W 1/10 |
| | | | 342/357.52 |
| 2003/0107490 A1 | 6/2003 | Sznaider et al. | |
| 2004/0043760 A1 | 3/2004 | Rosenfeld et al. | |
| 2005/0197776 A1 | 9/2005 | Makela et al. | |
| 2005/0258971 A1 | 11/2005 | Greenstein et al. | |
| 2006/0022846 A1 | 2/2006 | Tummala | |
| 2007/0073841 A1 | 3/2007 | Ryan et al. | |
| 2007/0088504 A1 | 4/2007 | Jantunen et al. | |
| 2007/0162328 A1 | 7/2007 | Reich | |
| 2009/0210353 A1 | 8/2009 | Mitchell et al. | |
| 2010/0238179 A1 | 9/2010 | Kelly | |
| 2011/0004511 A1 | 1/2011 | Reich | |
| 2011/0054776 A1 | 3/2011 | Petrov et al. | |
| 2011/0062968 A1 | 3/2011 | Renno et al. | |
| 2011/0099065 A1 | 4/2011 | Georgis et al. | |
| 2011/0128144 A1 | 6/2011 | Baron, Sr. et al. | |
| 2013/0009906 A1 | 1/2013 | Posamentier | |
| 2015/0042479 A1* | 2/2015 | Muetzel | G08B 21/10 |
| | | | 340/601 |
| 2015/0309895 A1 | 10/2015 | Tanimoto et al. | |

FOREIGN PATENT DOCUMENTS

| | | |
|---|---|---|
| JP | 2011526709 A | 10/2011 |
| JP | 2013 148535 A | 8/2013 |
| JP | 2013147131 A | 8/2013 |
| KR | 100782122 B1 | 12/2007 |
| MY | 135780 A | 6/2008 |
| WO | WO-0237332 A2 | 5/2002 |
| WO | WO-2004036476 A1 | 4/2004 |
| WO | WO-2007042600 A1 | 4/2007 |

OTHER PUBLICATIONS

International Search Report for PCT/US2015/040697 dated Nov. 23, 2015. 3 pages.

J.L. Levere; "Cruise Ship Campaign Aims at Vacationers Tired of Snow", <http://www.nytimes.com/2004/12/28/business/media/28adco.html?_r=0>; 3 pages.

H. Thomases; "Rain or Shine, Weather-Triggered Advertising is Fine", 3 pages<http://www.clickz.com/clickz/column/1710140/rain-shine-weather-trigger-advertising-is-fine>.

Notification Concerining Transmittal of International Preliminary Report on Patentability issued in PCT/US2014/055004 dated Mar. 14, 2017.

* cited by examiner

SMARTPHONE THAT DETECTS LIGHTNING STRIKES AND SYSTEM THAT DETERMINES LIGHTNING STRIKE LOCATIONS USING SMARTPHONES

RELATED APPLICATION

This application claims priority under 35 U.S.C. § 119 to U.S. Provisional Application No. 62/025,290, filed Jul. 16, 2014, of which the entire disclosure is hereby incorporated by reference.

BACKGROUND

Lightning is an electrostatic discharge between electrically charged regions within clouds or between a cloud and the surface of a planet. There are four primary types of lightning: intra-cloud lightning, cloud-to-cloud lightning, cloud-to-air lightning, and cloud-to-ground lightning. Cloud-to-cloud lightning is prevalent at the beginning of thunderstorms. Lightning detection systems, in combination with weather radar, are utilized by meteorological services to locate and track thunderstorms.

There are three primary types of lightning detection systems: ground-based systems utilizing multiple detectors, mobile detection systems (often aboard an aircraft), and space-based systems. Each type of lightning detection system has its own limitations. Because mobile detection systems utilize attenuation rather than triangulation to determine lightning location, mobile detection systems may have difficulty discerning whether a weak lightning strike is nearby or a strong lightning strike is far away. Because space-based lightning detection systems take more time to disseminate information than mobile or ground-based systems, information from space-based lightning detection systems is of limited value for real-time applications such as air navigation.

Meteorological services such as the U.S. National Weather Service utilize ground-based lightning detection systems, which utilize triangulation from multiple detectors in multiple locations to determine the location of lightning strikes. The National Lightning Detection Network (NLDN), for example, includes approximately 100 ground-based detectors located across the continental United States. Those detectors sense the electromagnetic signals of a lightning strike and transmit the data via a satellite to a central processing location in Tucson, Ariz., which estimates the location of the lightning strike by triangulating three or more signals.

Conventional ground-based lightning detection systems also suffer from a number of drawbacks. The most significant drawback is a lack of accuracy due to the limited number of ground-based detectors. Because ground-based lightning detectors may be hundreds of miles away, the accuracy of even the most advanced ground-based lightning detection systems is limited.

Detecting cloud-to-cloud lightning with conventional ground-based detection systems is particularly difficult because one detector may detect the location of lightning on the starting cloud and another detector may detect the location of lightning on the receiving cloud. In order to detect and locate cloud-to-cloud lightning within an acceptable margin of error, ground-based lightning detection systems require at least three detectors within the detection range. Because the number of ground-based lightning detectors is limited, conventional ground-based lightning detection systems underestimate cloud-to-cloud lightning. Conventional ground-based lightning detectors have similar drawbacks when detecting clout-to-air lightning.

The accuracy of conventional ground-based lightning detection networks may be improved by increasing the number of ground-based detectors. However, the cost of the network is increased each time a ground-based detector is manufactured, deployed, and maintained. Accordingly, there is a need for a lightning detection network with improved accuracy while minimizing the cost of manufacturing, deploying, and maintaining the ground-based detectors.

SUMMARY

In order to overcome these and other disadvantages in the related art, aspects of exemplary embodiments are provided.

According to an aspect of an exemplary embodiment, there is provided a system, including a lightning detection database and an analysis unit configured to receive, from a portable communication device via a communication network, data indicative of a location of the portable communication device and a distance between a lightning strike and the portable communication device, determine a location of the lightning strike based in part on the location of the portable communication device and the distance between the lightning strike and the portable communication device, and store the location of the lightning strike in the lightning detection database.

According to another aspect of the exemplary embodiment, there is provided a portable communication device, including a location detection unit configured to determine a location of the portable communication device, a lightning detection unit configured to detect a lightning strike and determine a distance between the lightning strike and the portable communication device, and a radio frequency circuit configured to output, via a communication network, data indicative of the location of the portable communication device and the distance between the lightning strike and the portable communication device.

According to another aspect of exemplary embodiments, there is provided a lightning detection method, including receiving, from a portable communication device via a communication network, data indicative of a location of the portable communication device and a distance between the lightning strike and the portable communication device, determining the location of the lightning strike based in part on the location of the portable communication device and the distance between the lightning strike and the portable communication device, and storing the location of the lightning strike in the lightning detection database.

BRIEF DESCRIPTION OF THE DRAWINGS

Aspects of exemplary embodiments may be better understood with reference to the accompanying drawings. The components in the drawings are not necessarily to scale, emphasis instead being placed upon illustrating the principles of exemplary embodiments.

DETAILED DESCRIPTION OF THE INVENTION

Figure 1:
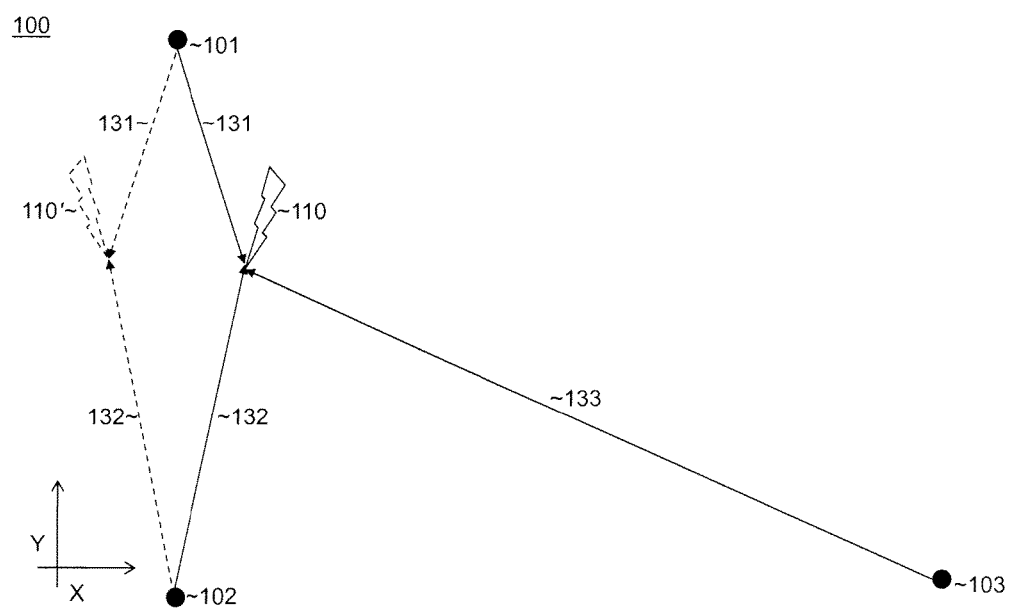
FIG. 1 is a top-down view of a conventional ground-based lightning detection system.

Exemplary embodiments of the present invention will be set forth in detail with reference to the drawings, in which like reference numerals refer to like elements or steps throughout.

FIG. 1 is a top-down view of a conventional ground-based lightning detection system 100. As illustrated in FIG. 1, the ground-based lightning detection system 100 includes ground-based lightning detectors 101, 102, and 103. The detectors 101, 102, and 103 are configured to a detect lightning strike 110, estimate the distance between each detector and the lightning strike 110, and communicate the distance to a central processor (not pictured) configured to estimate the location of a lightning strike 110 by triangulating the location of the lightning strike 110 and known locations of ground based detectors.

In response to a cloud-to-ground lightning strike 110, the lightning detector 101 estimates a distance 131 from the detector 101 to the lightning strike 110 and the lightning detector 102 estimates a distance 132 from the detector 102 to the lightning strike 110. The conventional lightning detection system 100 can only differentiate between a lightning strike at location 110 and a lightning strike at location 110' if the lightning strike is within the detectable range of a third lightning detector. In this example, the conventional lightning detection system 100 is only able to determine the location of the lightning strike 110 because the lightning detector 103 is within range to estimate a distance 133 from the detector 103 to the lightning strike 110.

Figure 2A:
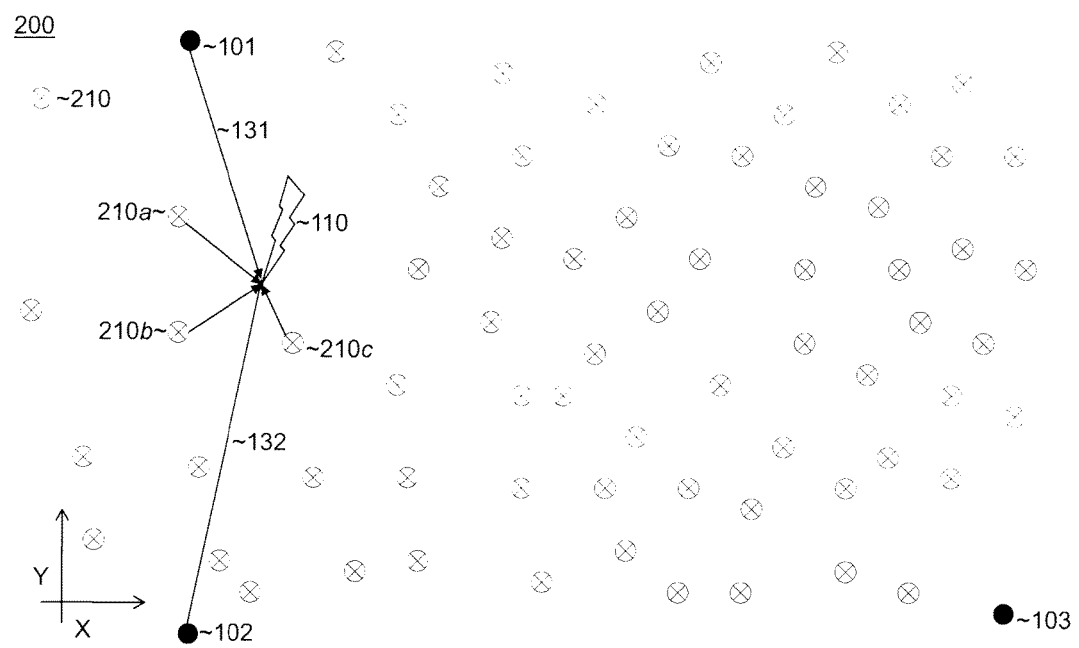
FIG. 2A is a top-down view of a ground-based lightning detection system according to an exemplary embodiment of the present invention.

FIG. 2A is a top-down view of a ground-based lightning detection system 200 according to an exemplary embodiment of the present invention. As illustrated in FIG. 2A, the lightning detection system 200 includes a plurality of lightning detectors 210 at locations across the Earth. Because the number of lightning detectors 210 is greater than the number of conventional lightning detectors 101-103, the accuracy and reliability of the lightning detection system 200 is significantly greater than the accuracy of a conventional lightning detection system 100. In the example illustrated in FIG. 2A, the lightning detection system 200 includes lightning detectors 210a, 210b, and 210c and may determine the location of a lightning strike 110 regardless of whether the conventional lightning detector 103 is located within range to detect the lightning strike 110.

Figure 2B:
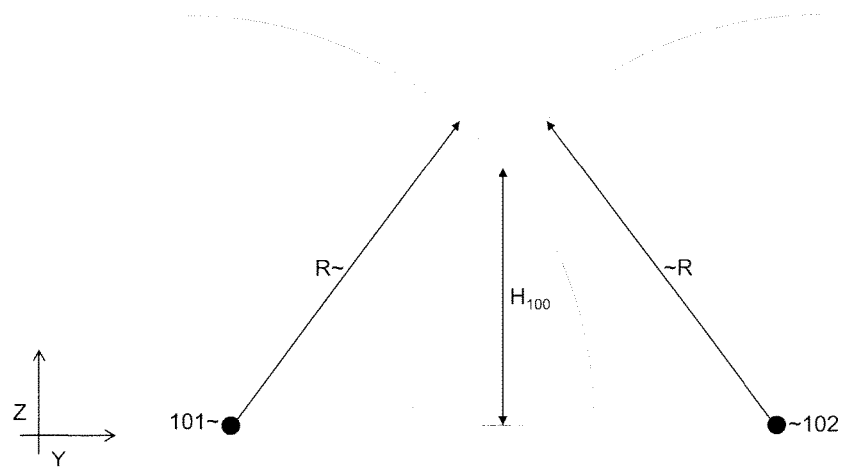
FIG. 2B is a side view of the conventional ground-based lightning detection system illustrated in FIG. 1.

The lightning detection system 200 also has an increased vertical range than the conventional lightning detection system 100. FIG. 2B is a side view of the conventional lightning detection system 100. Two conventional ground-based lightning detectors 101 and 102 are shown for simplicity. The same analysis, however, is true for systems requiring at least three detectors for triangulation. As illustrated in FIG. 2B, each of the conventional ground-based lightning detectors 101 and 102 has a range R. The overlap of each of the ranges R enables the conventional lightning detection system 100 to have an effective vertical range $H_{100}$.

Figure 2C:
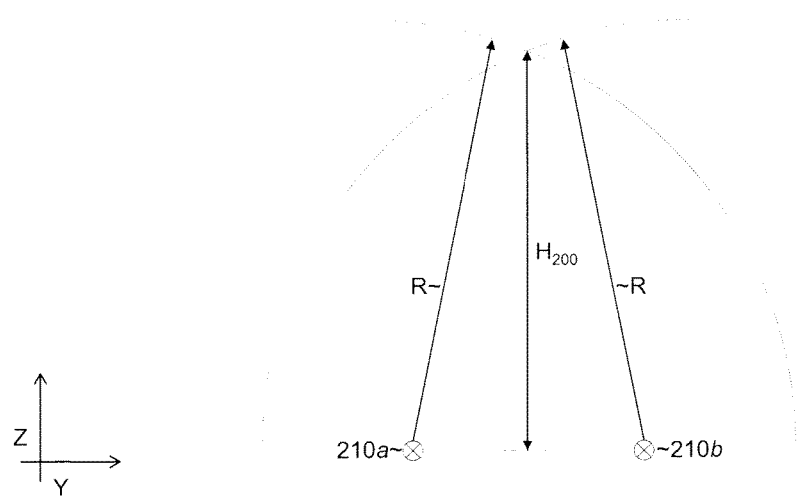
FIG. 2C is a side view of the ground-based lightning detection system illustrated in FIG. 2A.

FIG. 2C is a side view of the lightning detection system 200, including the lightning detectors 210a and 210b. Assuming the lightning detectors 210a and 210b have the same range R as the conventional ground-based lightning detectors 101 and 102, the proximity of the lightning detectors 210a and 210b enables the lightning detection system 200 to have an effective vertical range $H_{200}$ that is greater than the effective vertical range $H_{100}$ of the conventional lightning detection system 100.

The lightning detection system 200 may be combined with a conventional lightning detection system 100. For example, each of the lightning detectors 210 may output a distance between the lightning detectors 210 and a lightning strike 110 to the same central processor utilized by a conventional lightning detection system 100. By combining detections made by the conventional ground-based lightning detectors 101, 102, and 103 and detections made by the plurality of lightning detectors 210, the accuracy of the lightning detection system 200 is significantly greater than the accuracy of a conventional lightning detection system 100. The ground-based lightning detection system 200 may also be combined with one or more mobile lightning detection systems and/or space-based lightning detection systems to further increase the reliability and accuracy of lightning detection.

As described above, the cost of a conventional ground-based lightning detection system 100 is increased each time a ground-based detector 101-103 is manufactured, deployed, and maintained. As described below, however, the ground-based lightning detection system 200 reduces or eliminates the additional costs by incorporating the lightning detectors 210 into portable communication devices 300. In addition to increasing the accuracy of the lightning detection system 200, incorporating the lightning detectors 210 into portable communication devices 300 shifts the cost of deploying and maintaining the lightning detectors 210 from those who maintain the lightning detection system 200 to those who purchase and maintain the portable communication devices 300.

Figure 3:
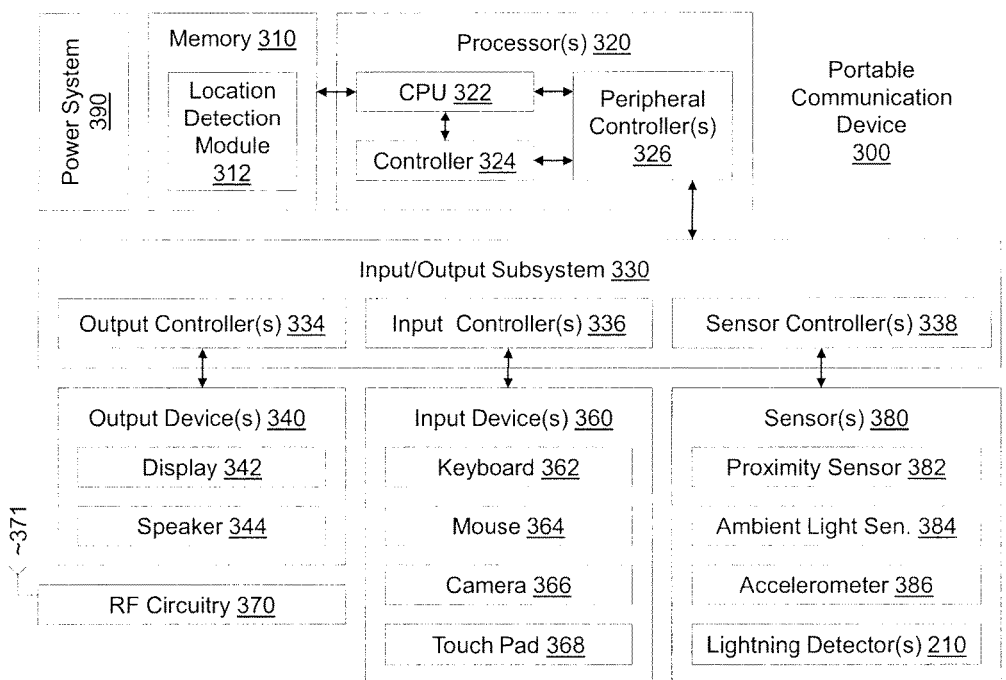
FIG. 3 is an overview of a communication device according to the exemplary embodiment of the present invention.

FIG. 3 is an overview of a portable communication device 300 according to an exemplary embodiment of the present invention. As illustrated in FIG. 3, the portable communication device 300 may include memory 310, one or more processors 320, an input/output subsystem 330, one or more output devices 340, one or more input devices 360, radio frequency (RF) circuitry 370, one or more sensors 380, and a power system 390.

The memory 310 may include one or more computer readable storage mediums. For example, the memory 310 may include high-speed random access memory and/or non-volatile memory such as one or more magnetic disk storage devices, flash memory devices, and/or other non-volatile solid-state memory, etc.

The portable communication device 300 includes a location detection module 312. The location detection module 312 may be any suitable device configured to determine or estimate the location of the communication device 310. As illustrated in FIG. 3, the location detection module 312 may be implemented as a set of instructions stored in the memory 310 executed by the one or more processors 320. Alternatively, the location detection module 312 may be implemented by hardware or a combination of hardware and computer readable instructions. The location detection module 312 may determine or estimate the location of the communication device 310 by any suitable means, including the global positioning system (GPS), assisted GPS (A-GPS), a Wi-Fi-based positioning system, cellular network-based positioning, etc.

The one or more processors 320 may include a central processing unit (CPU) 322, one or more controllers 324, and/or one or more peripheral controllers 326, etc. The processor(s) 320 may be integrated into a single semiconductor chip or may be implemented by more than one chip. The one or more processors 320 may execute various software programs and/or sets of instructions stored in the memory 310 to process data and/or to perform various functions for the device 300.

The input/output subsystem 330 couples input/output peripherals on the device 300, such as the output device(s) 340, the input devices 360, and the sensor(s) 380, to the peripheral controller(s) 326. The input/output subsystem 330 may include one or more output controllers 334, one or more input controllers 336 and/or one or more sensor controllers 338, etc. The one or more output controllers 334 send/receive electrical signals to/from the output device(s) 340. The one or more input controllers 334 receive/send electrical signals from/to the input device(s) 360. The one or more sensor controllers 338 receive/send electrical signals from/to the input device(s) 380.

The one or more output devices may include a display 342, a speaker 344, one or more external ports, etc. The display 342 may be any suitable device configured to output visible light, such as a liquid crystal display (LCD), a light emitting polymer display (LPD), a light emitting diode (LED), an organic light emitting diode (OLED), etc.

The one or more input devices 360 may include a keyboard 362, a mouse (or trackball) 364, a still or video camera 366, a touchpad 368, etc. The touchpad 368 may include any suitable technology to determine the location of a finger or stylus relative to the device 300. As described below, the touchpad 368 may include resistive touch sensors, self-capacitive touch sensors, mutually-capacitive touch sensors, etc. The touchpad 368 may be overlaid or integrated with the display 342 to form a touch-sensitive display or touchscreen.

The RF circuitry 370 may be any suitable device configured to send and/or receive RF signals. The RF circuitry 370 may include an antenna system 371, an RF transceiver, one or more amplifiers, a tuner, one or more oscillators, a digital signal processor, a CODEC chipset, a subscriber identity module (SIM) card, memory, etc. The RF circuitry 370 may communicate via electromagnetic signals with other communications devices or communications networks such as the Internet, an intranet, and/or a wireless network, such as a cellular telephone network, a wireless local area network (LAN), and other devices by wireless communication. The wireless communication may use any of a plurality of communications standards, protocols and technologies, including Global System for Mobile Communications (GSM), Enhanced Data GSM Environment EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11), voice over Internet Protocol (VoIP), Wi-MAX, or any other suitable communication protocol, including communication protocols not yet developed.

The power system 390 may be any suitable device configured to distribute electric power to components of the device 300. The power system 390 may include one or more power sources (e.g., battery, alternating current (AC), etc.), a power conversion system, a power management system, a recharging system, a power failure detection circuit, a power converter or inverter, a power status indicator (e.g., a light-emitting diode (LED)) and any other components associated with the generation, management and distribution of power in electronic devices.

The one or more sensors 380 may include a proximity sensor 382, an ambient light sensor 384, an accelerometer 386, a gyroscope, etc. The proximity sensor 382 may be any suitable device configured to detect whether the portable communication device 300 is within a predetermined distance of an object. For example, the personal communicator device 300 may be configured to deactivate the display 342 and/or the touch pad 368 when the proximity sensor 382 determines that the device 300 is near a user's face during a telephone phone call or a cover of the device 300 has been closed. The ambient light sensor 384 may be any suitable device configured to determine the amount of ambient light. For example, the personal communicator device 300 may be configured to adjust the brightness of the display 342 based on an amount of ambient light detected by the ambient light sensor.

The portable communication device 300 illustrated in FIG. 3 is an electronic device configured to send data to a mobile phone network (i.e., "a smartphone"). It should be appreciated, however, that the portable communication device 300 illustrated in FIG. 3 is only one example of a portable communication device, and that the device 300 may have more or fewer components than shown, may combine two or more components, or a may have a different configuration or arrangement of the components. In exemplary embodiments of the present invention, the portable communication device 300 may be any suitable electronic device configured to detect lightning, communicate with one or more networks 510, and perform at least one other function unrelated to lightning detection. The portable communication device 300 may be, for example, a network-connected computing device (such as a personal digital assistant (PDA), a tablet, a notebook computer, a portable weather detector, a GPS receiver, etc.), or a network-connected vehicle (such as a car, a ship, an airplane, a satellite truck, etc.).

In other exemplary embodiments, one or more of the lightning detectors 210 may be incorporated in a non-portable communication device such as a network-connected computer, appliance, home, building, or other structure. The non-portable communication device may determine and/or output its location to the lightning detection system 200. Alternatively, the location(s) of the non-portable communication device(s) may be known to the lightning detection system 200.

The portable communication device 300 includes one or more lightning detectors 210. The various components shown in FIG. 3 may be implemented in hardware, software, or a combination of both hardware and software, including one or more signal processing and/or application specific integrated circuits.

The one or more lightning detectors 210 may be any suitable device configured to detect lightning. The lightning detector(s) 210 may detect that a lightning strike 110 has occurred proximate to the location of the portable communication device 300 and/or may determine or estimate a distance or direction from the location of the portable communication device 300 to the lightning strike 110.

In some exemplary embodiments, the one or more lightning detectors 210 may be incorporated into the portable communication device 300 by adding additional hardware specifically configured to detect a lightning strike 110. In other more preferable exemplary embodiments, the one or more lightning detectors 210 are implemented utilizing one or more hardware components of the portable communication device 300 that perform additional functions unrelated to lightning detection. Utilizing one or more hardware components that perform additional functions unrelated to lightning detection further reduces the cost of manufacturing, deploying, and maintaining the lightning detectors 310.

According to one exemplary embodiment, the one or more lightning detectors 210 may include a radio frequency (RF) lightning detector. The RF lightning detector may be any suitable device configured to detect an RF electromagnetic signal generated by lightning. The RF lightning detector may also determine or estimate the distance between the portable communication device 300 and the lightning strike 110 based on, for example, the amplitude of the detected energy discharge. The RF lightning detector may be implemented as additional hardware incorporated in the portable communication device 300 to detect an RF electromagnetic signal generated by lightning. More preferably, however, the RF lightning detector may utilize the antenna system 371 of the RF circuitry 370 to detect an RF electromagnetic signal generated by lightning. In this more preferable embodiment, the antenna system 371 is also utilized by the RF circuitry 370 to send and/or receive RF signals as described above.

According to another exemplary embodiment, the one or more lightning detectors 210 may include an interferometer. The interferometer may be any suitable device configured to measure the phase difference between (narrow-band or broad-band) signals received by two or more sensors. For example, the interferometer may be two closely spaced antennas, each antenna being connected via a narrow band filter to a phase detector that outputs a voltage proportional to the difference in phase between the two signals received by the antennas. In that example, the phase difference may be utilized to identify the direction, on a plane perpendicular to the plane of the two antennas, of a detected lightning strike 110. The interferometer may also determine or estimate the distance between the portable communication device 300 and the lightning strike 110 based on, for example, the amplitude of the signals received by the two or more sensors. The interferometer may be implemented as additional hardware incorporated in the portable communication device 300 to detect two signals generated by lightning. More preferably, however, the interferometer may utilize the antenna system 371 of the RF circuitry 370 to detect two signals generated by lightning. In that more preferable embodiment, the antenna system 371 is also utilized by the RF circuitry 370 to send and/or receive RF signals as described above.

According to another exemplary embodiment, the one or more lightning detectors 210 may include an optical monitor. The optical monitor may be any suitable device configured to detect a light pulse produced by cloud-to-ground lightning or cloud-to-cloud lightning. In some instances, cloud-to-cloud lightning precedes cloud-to-ground lightning. The optical monitor may also determine or estimate the distance between the portable communication device 300 and the lightning strike 110 based on, for example, the amplitude of the light pulse detected by the optical monitor. The optical monitor may be implemented as additional hardware incorporated in the portable communication device 300 to detect a light pulse generated by lightning. More preferably, however, the optical monitor may utilize hardware components of the portable communication device 300 (such as the proximity sensor 382 and/or camera 366) to detect the light pulse. In this more preferable embodiment, the hardware component used to detect the light pulse generated by lightning is also utilized by the portable communication device 300 to perform additional functions as described above.

According to another exemplary embodiment, the one or more lightning detectors 210 may include an electric field monitor. The electric field monitor may be any suitable device configured to measure changes in an electric field, for example changes in the potential gradient (voltage) of the Earth's electric field that occur in proximity to a lightning strike 110. The electric field monitor may also determine or estimate the distance between the portable communication device 300 and the lightning strike 110 based on, for example, the amplitude of the change in the electric field detected by the electric field monitor. The electric field monitor may be implemented as hardware incorporated in the portable communication device 300 (for example, an electric field mill). More preferably, however, the atmospheric electric field monitor may utilize the touch pad 368 (as described below with reference to FIGS. 4A and 4B) to detect changes in an electric field that occur in proximity to a lightning strike 110.

As one of ordinary skill in the art would recognize, the one or more lightning detectors may include more than one type of lightning detector. In one example, the one or more lightning detectors 210 may include an RF lightning detector and an optical monitor. An RF lightning detector may sense RF interference and misinterpret the RF noise as a detection of a nearby lightning strike 110. In that instance, the lightning detectors 210 may be configured to output a lightning detection signal only if lightning is detected by both the RF lightning detector and the optical monitor. More than one lightning detector may also be used determine or estimate the distance between the portable communication device 300 and the lightning strike 110 based on, for example, the amount of time between the detection of an optical pulse by an optical monitor and the detection of an RF electromagnetic signal by an RF lightning detector.

The lightning detector 210 may include software instructions, stored in the memory 310 and executed by the one or more processors 320. Regardless of whether a lightning detector 210 utilizes hardware components of the portable communication device 300 that perform additional functions unrelated to lightning detection (such as the antenna system 371, the touch pad 368, etc., as described above) the lightning detector 210 may also include additional hardware (for example to filter or process the signals generated by lightning and detected by the lightning detector 210) which may be additional hardware specifically configured to detect a lightning strike 110 or hardware components of the portable communication device 300 that perform additional functions unrelated to lightning detection.

Figure 4A:
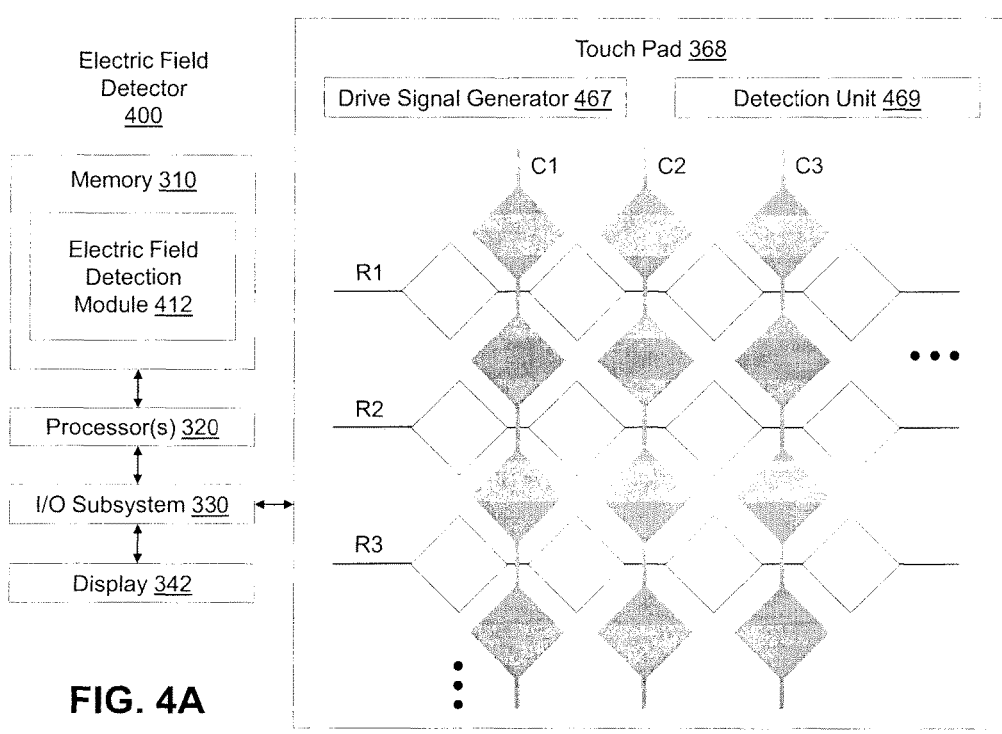
FIG. 4A is an overview of an electric field detector of a communication device according to the exemplary embodiment of the present invention.

FIG. 4A is an overview of an electric field detector 400 of a communication device according to exemplary embodiments of the present invention. As described above with reference to FIG. 3, the portable communication device 300 includes memory 310, one or more processors 320, an input/output subsystem 330 and a touch pad 368. The touch pad 368 includes a drive signal generator 467, a detection unit 469, column traces C1, C2, C3, etc., and row traces R1, R2, R3, etc. The touch pad may be overlaid or integrated with a display 342 to form a touch-sensitive display or touchscreen.

According to one exemplary embodiment, the touch pad 368 is a mutual capacitive touch sensor. A mutual capacitive touch sensor pad includes a capacitor at each intersection of a column trace (e.g., C1, C2, etc.) and a row trace (e.g., R1, R2, etc.). A voltage is applied to the columns or rows. When a finger or conductive stylus is near the surface, the finger or stylus changes the local electric field which reduces the mutual capacitance. The capacitance change at every individual point on the grid can be measured to accurately determine the touch location by measuring the voltage in the other axis. For example, if a voltage is applied to columns C1, C2, etc., the capacitive change can be measured by measuring the voltage in each of the rows R1, R2, etc. A mutual capacitive touch sensor is generally preferable to a self-capacitive touch sensor because mutual capacitive touch sensors can accurately track multiple fingers or styli at the same time.

According to another exemplary embodiment, the touch pad 368 is a self-capacitive touch sensor. Self-capacitive touch sensors have the same grid of columns and rows as mutual capacitance sensors, but the columns and rows operate independently. With self-capacitance, current senses the capacitive load of a finger or stylus on each column or row. A self-capacitive touch sensor cannot accurately resolve more than one simultaneous touch. A self-capacitive touch sensor, however, produces stronger signal than a mutual capacitive touch sensor.

According to another exemplary embodiment, the touch pad 368 has both self capacitive and mutual capacitive touch sensing capability. With both self-capacitive and mutual capacitive touch sensing capability, the touch pad 368 may include two modes: an electric field detection mode where the touch pad 368 utilizes self-capacitive touch sensing to more accurately detect changes in the electric field and a touch sensing mode where the touch pad 368 utilizes mutual capacitive touch sensing capability to detect more than one simultaneous touch.

Figure 4B:
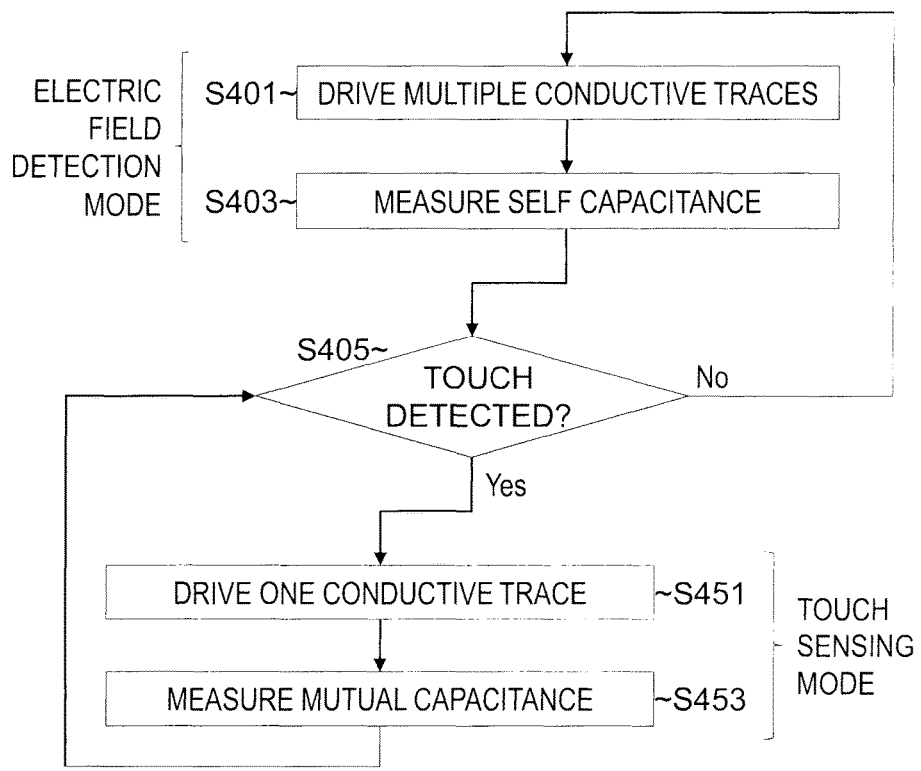
FIG. 4B is a flowchart illustrating a method of touch sensing and electric field detection utilizing the electric field detector illustrated in FIG. 4A according to the exemplary embodiment of the present invention.

FIG. 4B is a flowchart illustrating an example of a method of touch sensing and electric field detection utilizing the electric field detector 400 illustrated in FIG. 4A. Referring to FIG. 4B, the default state of the touch pad 368 is the electric field detection mode. In electric field detection mode, the drive signal generator 467 drives multiple conductive traces in operation S401, and the detection unit 469 measures the self-capacitance in operation S403. Because self capacitive sensing produces a stronger signal than mutual capacitive sensing, the touch pad 368 in the electric field detection mode is capable of more accurately detecting changes in the Earth's electric field caused by a lightning strike 110 proximate to the portable communication device 300. By measuring the self-capacitance of multiple conductive traces, the touch pad 368 is also capable of determining if the touch pad 368 is being approached or touched by a finger or stylus.

As illustrated in FIG. 4B, the touch pad 368 repeatedly determines whether a finger or stylus is touching the touch pad 368 in operation S405. If the touch pad 368 is not being touched by a finger or stylus, the touch pad 368 continues in the electric field detection mode by repeating operations S401 and S403. If the touch pad 368 is being touched by a finger or stylus, the touchpad 368 enters the touch sensing mode.

In touch sensing mode, the drive signal generator 467 drives one conductive trace at a time (for example, column trace C1) in operation S451 and the detection unit 469 measures the mutual capacitance on one conductive trace along the other axis (in this example, a row trace R1, R2, etc.) in operation S453. Because mutual capacitive sensors are able to resolve more than one touch, the touch pad 368 provides multi-touch capabilities while the touch pad 368 is in the touch sensing mode. While the touch pad 368 is in touch sensing mode, the touch pad 368 repeatedly determines whether the touch pad 368 is being touched by a finger or stylus in operation S405. If the touch pad 368 continues to be touched by a finger or stylus, the touch pad 368 continues in touch sensing mode. Otherwise, the touch pad 368 returns to the electric field detection mode.

Figure 5:
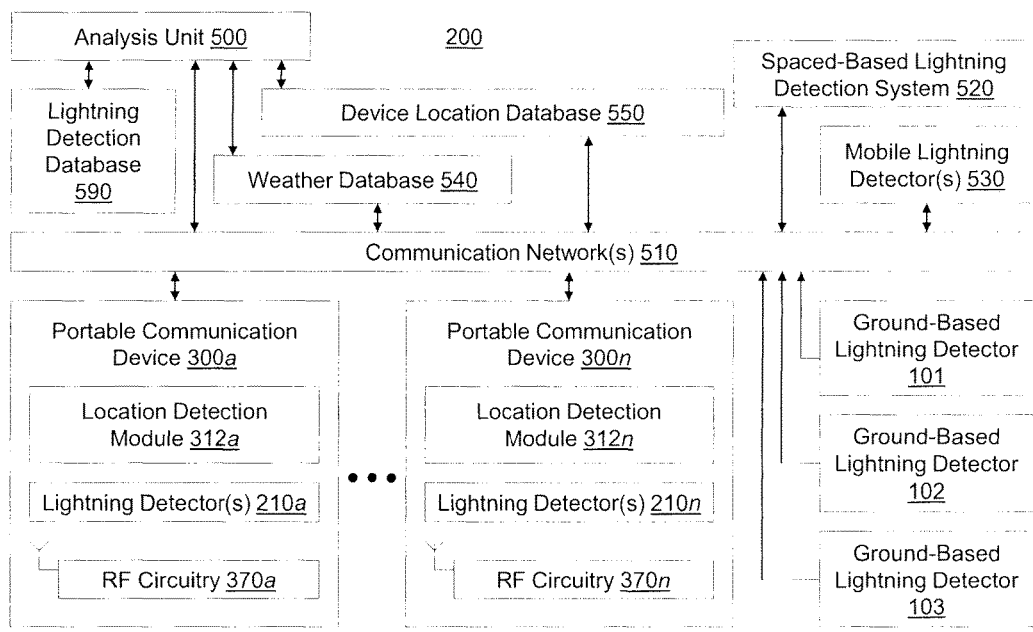
FIG. 5 is another overview of the lightning detection system illustrated in FIG. 2A according to an exemplary embodiment of the present invention.

FIG. 5 is another overview of the lightning detection system 200 according to an exemplary embodiment of the present invention. As illustrated in FIG. 5, the lightning detection system 200 includes an analysis unit 500, one or more communications networks 510, a lightning detection database 590, and one or more portable communication devices 300a-n.

The analysis unit 500 may any suitable computing device (e.g., a server) configured to receive data from the one or more portable communication devices 300a-n through the one or more communications networks 510. The analysis unit 500 may also receive data from a space-based lightning detection system 520 and/or one or more mobile lightning detectors 530 and or one or more conventional ground-based lightning detector(s) 101-103.

The one or more communications networks 500 may include the Internet, an intranet, and/or a wireless network, such as a cellular telephone network, a wireless local area network (LAN), etc. The wireless communication may utilize any of a plurality of communications standards, protocols and technologies described above regarding the RF circuitry 370. Some or all of the personal communications devices 300a-n may communicate with the one or more communications networks 500 via the RF circuitry 370a-n. Alternatively, some or all of the personal communications devices 300a-n may communicate with the one or more communications networks 510 via a wired connection such as Ethernet, universal serial bus (USB), etc.

According to an aspect of the exemplary embodiments, the analysis unit 500 is configured to receive, from one or more of the portable communication devices 300a-n via the one or more communications networks 510: data indicative of a lightning strike 110 (detected, for example, by the one or more lightning detectors 210a-n), data indicative of the location of the portable communication device 300a (determined, for example, by the location detection module 312a-n), and data indicative of each of the distances between the one or more of the portable communication devices 300a-n and the lightning strike 110 (determined, for example, by the one or more lightning detectors 210a-n). Similarly, the analysis unit 500 may receive, from one or more of the conventional ground-based lightning detectors 101-103 or mobile lightning detectors 530: data indicative of a lightning strike 110, data indicative of the location of the detector 101-103 or 530, and data indicative of the distances between the detector 101-103 or 530 and the lightning strike 110.

The analysis unit 500 may also send and/or receive weather data or weather forecast data. For example, the analysis unit 500 may receive weather data or weather forecast data (either directly or via communication network(s) 510) from a weather database 540. The analysis unit 500 may also be configured to output data indicative of a lightning strike 110 (e.g., the time and/or location of one or more lightning strikes 110) and/or weather data and/or weather forecast data to the communication network(s) 510 for transmittal to one or more portable communication devices 300a-n. The analysis unit 500 may also output/transmit the data indicative of a lightning strike 110 via the communication network(s) 510 to one or more communication devices that do not include a lightning detector 210.

In one example, the analysis unit 500 may be configured to output to a portable communication device 300 a map and an indication on the map of the location of a lightning strike 110. In another example, the analysis unit may receive the location of a portable communication device 300 and may output data indicative of a lightning strike 110 if the lightning strike 110 is within a predetermined distance of the location of the portable communication device 300. Data indicative of the location of portable communication devices 300 may be stored in a communication device location database 550. The analysis unit 500 may receive the data indicative of the location of the communication devices from the communication device location database 550 either directly or via the communication network(s) 510.

The analysis unit 500 of the lightning detection system 200 is configured to determine the location of a lightning strike 110 by triangulating the distance between the lightning strike 110 and three or more detectors 210*a-c* or 101-103 (see FIG. 2A) and storing the location of the lightning strike 110 in the lightning detection database 590.

As described above, the lightning detection system 200 detects the location of lightning strikes 110 with increased reliability and accuracy as compared to conventional ground-based lightning detection systems 100 by increasing the number of lightning detectors 210. The lightning detection system 200 reduces the cost of manufacturing, deploying, and maintaining the additional lightning detectors 210 by incorporating the lightning detectors 210 in portable communication devices 300 and/or utilizing hardware already incorporated in portable communication devices 300 to detect or estimate the location of the portable communication devices 300, detect or estimate a distance between the portable communication devices 300 and a lightning strike 110, and communicate data indicative of the location of the portable communication devices 300 and a distance between the portable communication devices 300 and a lightning strike 110 through one or more communications networks 510 to the analysis unit 500.

While preferred embodiments have been set forth above, those skilled in the art who have reviewed the present disclosure will readily appreciate that other embodiments can be realized within the scope of the invention. For example, disclosures of specific numbers of hardware components, software modules and the like are illustrative rather than limiting. Therefore, the present invention should be construed as limited only by the appended claims.

What is claimed is:

1. A lightning detection system, comprising:
a lightning detection database; and
an analysis unit configured to:
receive, from a plurality of portable communication devices via a communication network, data indicative of a location of the plurality of portable communication devices and data indicative of distances between a lightning strike and the plurality of portable communication devices;
determine a location of the lightning strike based in part on the data indicative of the distances from the lightning strike to the locations of the plurality of portable communication devices; and
store the location of the lightning strike in the lightning detection database, wherein at least one of the portable communication devices is a smartphone.

2. The system of claim 1, wherein the smartphone comprises one or more antennas, and the smartphone is configured to:
output the data to the communication network using the one or more antennas; and
determine the distance between the lightning strike and the smartphone based on radio frequency signals received by the one or more antennas.

3. The system of claim 2, wherein the smartphone is configured to determine the distance between the lightning strike and the smartphone by detecting a radio frequency electromagnetic signal using the one or more antennas.

4. The system of claim 2, wherein one or more antennas comprises two antennas, and the smartphone is configured to determine the distance between the lightning strike and the smartphone by detecting a phase difference between two signals received by the two antennas.

5. The system of claim 1, wherein the smartphone comprises a display and a proximity sensor, and the smartphone is configured to:
deactivate the display when the proximity sensor determines that the smartphone is within a predetermined distance of an object; and
determine the distance between the lightning strike and the smartphone based on the output of the proximity sensor.

6. The system of claim 1, wherein the smartphone comprises a display and an ambient light sensor, and the smartphone is configured to:
adjust a brightness of the display based on the output of the ambient light sensor; and
determine the distance between the lightning strike and the smartphone based on the output of the ambient light sensor.

7. The system of claim 1, wherein the smartphone comprises a camera, and the smartphone is configured to:
capture still images and/or motion pictures based on the output of the camera; and
determine the distance between the lightning strike and the smartphone based on the output of the camera.

8. The system of claim 1, wherein the smartphone comprises a touch pad, and the smartphone is configured to determine the distance between the lightning strike and the smartphone based on changes in an electric field detected by the touch pad.

9. The system of claim 8, wherein the touch pad is a capacitive touch pad including a plurality of conductive traces, and the smartphone is configured to:
drive two or more of the conductive traces; and
determine the distance between the lightning strike and the smartphone based on a self capacitance of two or more of the conductive traces.

10. The system of claim 8, wherein the touch pad is a capacitive touch pad including a plurality of conductive traces, the plurality of conductive traces including a plurality of conductive rows and a plurality of conductive columns, and the smartphone is configured to:
sequentially drive the conductive columns or the conductive rows; and
determine the distance between the lightning strike and the smartphone based on a mutual capacitance between the conductive columns and conductive rows.

11. The system of claim 8, wherein the touch pad is a capacitive touch pad including a plurality of conductive traces, the plurality of conductive traces including a plurality of conductive rows and a plurality of conductive columns, and the smartphone is configured to:
drive two or more of the conductive traces;

determine the distance between the lightning strike and the smartphone based on a self capacitance of the two or more conductive traces;

determine whether one or more fingers or conductive styli are proximate to the touch pad based on the self capacitance of the multiple conductive traces;

sequentially drive the conductive columns or the conductive rows in response to a determination that one or more fingers or conductive styli are proximate to the touch pad;

determine a location of the one or more fingers or conductive styli based on a mutual capacitance between the conductive columns and the conductive rows.

12. A smartphone, comprising:
a location detection unit configured to determine a location of the smartphone;
a lightning detection unit configured to detect a lightning strike and determine a distance between the lightning strike and the smartphone; and
a radio frequency circuit configured to output, via a communication network, data indicative of the location of the smartphone and data indicative of the distance between the lightning strike and the smartphone,
wherein the lightning detection unit is configured to determine the data indicative of the distance between the lightning strike and the smartphone based on:
one or more light pulses detected by a proximity sensor; or
one or more light pulses detected by an ambient light sensor; or
one or more light pulses detected by a camera; or
changes in an electric field detected by a touch pad.

13. The smartphone of claim 12, wherein the smartphone is configured to deactivate the display when the proximity sensor determines that the smartphone is within a predetermined distance of an object.

14. The smartphone of claim 12, wherein the smartphone is configured to adjust a brightness of the display based on the output of the ambient light sensor.

15. The smartphone of claim 12, wherein the smartphone is configured to capture still images and/or motion pictures based on the output of the camera.

16. The smartphone of claim 12, wherein the touch pad is a capacitive touch pad including a plurality of conductive traces, and the smartphone is configured to:
drive two or more of the conductive traces; and
determine the distance between the lightning strike and the smartphone based on a self capacitance of two or more of the conductive traces.

17. The smartphone of claim 12, wherein the touch pad is a capacitive touch pad including a plurality of conductive rows and a plurality of conductive columns, and the smartphone is configured to:
sequentially drive the conductive columns or the conductive rows; and
determine the distance between the lightning strike and the smartphone based on a mutual capacitance between the conductive columns and conductive rows.

18. The smartphone of claim 12, wherein the touch pad is a capacitive touch pad including a plurality of conductive traces, the plurality of conductive traces including a plurality of conductive rows and a plurality of conductive columns, and the smartphone is configured to:
drive two or more of the conductive traces;
determine the distance between the lightning strike and the smartphone based on a self capacitance of the two or more conductive traces;
determine whether one or more fingers or conductive styli are proximate to the touch pad based on the self capacitance of the multiple conductive traces;
sequentially drive the conductive columns or the conductive rows in response to a determination that one or more fingers or conductive styli are proximate to the touch pad;
determine a location of the one or more fingers or conductive styli based on a mutual capacitance between the conductive columns and the conductive rows.

* * * * *